United States Patent
Chan et al.

(10) Patent No.: US 9,703,050 B2
(45) Date of Patent: Jul. 11, 2017

(54) DEVICE FOR ROUTING LIGHT AMONG A SET OF OPTICAL WAVEGUIDES

(71) Applicant: City University of Hong Kong, Kowloon (HK)

(72) Inventors: Hau Ping Chan, New Territories (HK); Valentine A. Tsvetkov, Moscow (RU); Wing Fat Ho, New Territories (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 0 days.

(21) Appl. No.: 14/142,699

(22) Filed: Dec. 27, 2013

(65) Prior Publication Data

US 2015/0185422 A1    Jul. 2, 2015

(51) Int. Cl.
  *G02B 6/35* (2006.01)
  *G02F 1/13* (2006.01)
  (Continued)

(52) U.S. Cl.
  CPC .......... *G02B 6/3596* (2013.01); *G02B 6/136* (2013.01); *G02F 1/1326* (2013.01);
  (Continued)

(58) Field of Classification Search
  CPC .... G02B 6/29395; G02B 6/35; G02B 6/3596; G02B 6/136; G02B 6/3546; G02B 6/355;
  (Continued)

(56) References Cited

U.S. PATENT DOCUMENTS

| 3,303,085 A | 2/1967 | Price et al. |
| 3,438,504 A | 4/1969 | Furman |

(Continued)

FOREIGN PATENT DOCUMENTS

| FR | EP 1536274 A1 * | 6/2005 | ............. G02F 1/225 |
| JP | 02272422 A * | 11/1990 | |
| JP | 2006017790 A * | 1/2006 | |

OTHER PUBLICATIONS

Isfahani et al., (NPL: All-optical NOR gate based on nonlinear photonic crystal microring resonators, J. Opt. Soc. Am. B 26, 1097-1102 (2009); "Isfahani").*

(Continued)

*Primary Examiner* — Peter Radkowski
(74) *Attorney, Agent, or Firm* — Amin, Turocy & Watson, LLP (57) ABSTRACT

Light streams are routed. A transparent plate can be provided in which at least 2 waveguides converge on an active region, wherein the active region comprises a switching element, which can be utilized to extract a portion of the light stream or combine two or more wavelength portions for form a subsequent light stream. Cladding material constrains a light stream to a waveguide. Ion bombardment can be utilized to form micropores in the cladding material, and subsequent etching can enlarge the micropores to form larger diameter pores (of nanometer scale) in the switching element. The pores can be filled with liquid crystal, which can be in a passive state with a first refractive (RI) index, and a second active state (electrical voltage applied) with a second RI. By adjusting the RI, the light stream can be diverted by operations of refraction, diffraction, reflection, etc.

20 Claims, 7 Drawing Sheets

(51) Int. Cl.
*G02B 6/136* (2006.01)
*G02F 1/313* (2006.01)
*G02B 6/12* (2006.01)

(52) U.S. Cl.
CPC ............ *G02F 1/3137* (2013.01); *G02B 6/355* (2013.01); *G02B 6/3546* (2013.01); *G02B 6/3594* (2013.01); *G02B 2006/12107* (2013.01)

(58) Field of Classification Search
CPC ........ G02B 6/3594; G02B 2006/12107; G02F 1/1326; G02F 1/3137
USPC ...................................................... 385/17, 50
See application file for complete search history.

(56) References Cited

U.S. PATENT DOCUMENTS

| | | | |
|---|---|---|---|
| 3,852,134 A | 12/1974 | Bean | |
| 3,918,794 A * | 11/1975 | Milton | G02B 6/2817 349/196 |
| 4,201,442 A * | 5/1980 | McMahon | G02F 1/3137 349/196 |
| 4,278,327 A * | 7/1981 | McMahon | G02F 1/1326 349/197 |
| 4,640,592 A | 2/1987 | Nishimura et al. | |
| 4,720,172 A * | 1/1988 | Baker | G02F 1/1326 349/139 |
| 4,728,166 A * | 3/1988 | Turner | G02F 1/3137 385/132 |
| 4,737,014 A * | 4/1988 | Green | G02F 1/1326 385/123 |
| 4,775,207 A * | 10/1988 | Silberberg | G02F 1/3137 385/21 |
| 4,828,362 A * | 5/1989 | Skinner | G02F 1/313 385/18 |
| 5,007,696 A | 4/1991 | Thackara et al. | |
| 5,045,847 A | 9/1991 | Tarui et al. | |
| 5,331,446 A * | 7/1994 | Hirai | G02F 1/1334 349/177 |
| 5,544,268 A | 8/1996 | Bischel et al. | |
| 5,594,818 A * | 1/1997 | Murphy | G02F 1/3137 385/8 |
| 5,664,032 A | 9/1997 | Bischel et al. | |
| 6,064,506 A * | 5/2000 | Koops | B81B 1/008 349/41 |
| 6,195,287 B1 | 2/2001 | Hirano | |
| 6,411,752 B1 * | 6/2002 | Little | G02B 6/12002 385/17 |
| 6,559,921 B1 * | 5/2003 | Leslie | G02F 1/1326 349/196 |
| 6,563,973 B1 * | 5/2003 | Caracci | G02F 1/1326 349/196 |
| 6,684,008 B2 * | 1/2004 | Young | B82Y 20/00 385/129 |
| 6,912,334 B2 * | 6/2005 | Koyama | B82Y 20/00 385/129 |
| 6,934,436 B2 | 8/2005 | Tapalian et al. | |
| 6,937,781 B2 * | 8/2005 | Shirane | B82Y 20/00 359/320 |
| 6,999,669 B2 * | 2/2006 | Summers et al. | 385/131 |
| 7,215,842 B2 * | 5/2007 | Sakai et al. | 385/16 |
| 7,218,798 B2 * | 5/2007 | Aoki | B82Y 20/00 385/17 |
| 7,263,251 B2 * | 8/2007 | Shirane | B82Y 20/00 359/320 |
| 7,315,663 B2 * | 1/2008 | Wu | B82Y 20/00 385/16 |
| 7,359,606 B2 * | 4/2008 | Ushida | G02F 1/365 385/125 |
| 7,413,678 B1 * | 8/2008 | Natarajan et al. | 252/299.01 |
| 7,428,348 B2 * | 9/2008 | Prather | B82Y 20/00 385/129 |
| 7,428,351 B2 | 9/2008 | Jenkins et al. | |
| 7,522,807 B2 | 4/2009 | Rolston et al. | |
| 7,574,084 B2 | 8/2009 | Yan et al. | |
| 7,715,665 B2 * | 5/2010 | Ushida | G02F 1/365 385/11 |
| 8,009,941 B2 * | 8/2011 | Sigalas | B82Y 20/00 385/125 |
| 2002/0036299 A1 * | 3/2002 | Young | B82Y 20/00 257/184 |
| 2002/0146196 A1 * | 10/2002 | Shirane | B82Y 20/00 385/16 |
| 2003/0020865 A1 * | 1/2003 | Hoke | B82Y 20/00 349/198 |
| 2003/0128949 A1 * | 7/2003 | Kitagawa | G02F 1/313 385/129 |
| 2004/0081388 A1 * | 4/2004 | Koyama | B82Y 20/00 385/16 |
| 2004/0126072 A1 * | 7/2004 | Hoon Lee | B82Y 10/00 385/122 |
| 2004/0165815 A1 * | 8/2004 | Kitagawa | G02F 1/035 385/16 |
| 2004/0170352 A1 * | 9/2004 | Summers | B82Y 20/00 385/16 |
| 2004/0195962 A1 * | 10/2004 | Nakamura | H01L 51/5262 313/504 |
| 2005/0002605 A1 * | 1/2005 | Sakai et al. | 385/27 |
| 2005/0147339 A1 * | 7/2005 | Prather | B82Y 20/00 385/9 |
| 2005/0249455 A1 * | 11/2005 | Shirane | B82Y 20/00 385/16 |
| 2006/0088240 A1 * | 4/2006 | Aoki | B82Y 20/00 385/9 |
| 2006/0198416 A1 * | 9/2006 | Yamazaki | H01S 5/0612 372/94 |
| 2006/0261324 A1 * | 11/2006 | Ushida | G02F 1/365 257/14 |
| 2006/0280396 A1 * | 12/2006 | Wu | B82Y 20/00 385/4 |
| 2008/0152837 A1 * | 6/2008 | Chien | B32B 3/30 427/536 |
| 2008/0316749 A1 * | 12/2008 | Ushida | G02F 1/365 362/293 |
| 2009/0269005 A1 * | 10/2009 | Sigalas | B82Y 20/00 385/16 |

OTHER PUBLICATIONS

Tameh et al., (NPL: Improving the performance of all-optical switching based on nonlinear photonic Crystal microring resonators, AEU—International Journal of Electronics and Communications, vol. 65, Issue 4, Apr. 2011, pp. 281-287; "Tameh").*

Matthias, et al. "Liquid crystal director fields in micropores of photonic crystals", Journal of Optics A: Pure and Applied Optics, vol. 9, Aug. 23, 2007, pp. S389-S395.

* cited by examiner

FIG. 3A
PR-planar radial

FIG. 3B
ER-escaped radial

FIG. 3C
PP-planar polar

FIG. 3D
UA-uniform axial or after applied voltage

Example of porous film, the pores size- 420 nm, density ~6 × 10^11 pores/sq.m

DEVICE FOR ROUTING LIGHT AMONG A SET OF OPTICAL WAVEGUIDES

TECHNICAL FIELD

The subject specification relates generally to optical communication, e.g., manipulation of one or more light streams in flat waveguide(s) to facilitate routing of a light stream among a plurality of channels.

BACKGROUND

Electro-optic systems have been developed to facilitate transmission of data, images, signaling, etc., via fiber optic links, where systems such as wavelength-division-multiplexing (WDM) and dense WDM (DWDM) have been developed to increase the channel capacity (e.g., bandwidth) of such electro-optic technologies. Generally speaking, channel routing and switching has been attempted to facilitate directing and access to data, etc., at a particular node, where an optical switch can be utilized to direct one of more wavelength streams. Early electro-optic switching utilized optical-electrical-optical (OEO) techniques to extract a light stream of a given wavelength, convert the light stream to an electrical signal to pass the data contained in the light stream through the electro-optic switch and subsequently reconvert the electrical signal back into a light stream to facilitate transmission of the data through a subsequent fiber optic link comprising the electro-optic system.

To improve the efficiency of electro-optic circuits, technologies have been developed to address the inefficiency inherent in OEO approaches (e.g., the conversion from light to electric form and back to light form), whereby newer technologies have attempted to guide a light stream without having to convert to an electrical signal.

Waveguide systems have been developed to facilitate routing a light stream from a single waveguide channel into two channels (e.g., a Y-splitter), or from two channels to another two channels (e.g., an X-splitter), and vice-versa. A switching unit can comprise two waveguides, which have a small branching angle at the point at which the two waveguides meet. Waveguides are formed in a layer of optically nonlinear polymer possessing an initial isotropic refraction index (RI)=$n_{plate}$. By heating a localized region of the layer (e.g., a portion to form a desired waveguide path) to a temperature above the glass-transition temperature, partially orientating dipolar moieties (e.g., by 'poling' with an applied voltage) in the localized region, and subsequent slow cooling, an optically anisotropic region having RI=$n_{wv}$ is formed with the optical axis directed along an electrical field where $n_{wv}$>$n_{plate}$. The optically anisotropic region of the layer, having RI=$n_{wv}$, forms a core waveguide with the remainder of the layer, having RI=$n_{plate}$, being used as cladding media to encapsulate the waveguide and constrain a light stream(s) therewithin. With a Y-splitter or an X-splitter, an active zone can be formed at the junction of the respective waveguides. The active zone can comprise switching electrodes, which can be used to apply a modulating electric field to change the RI in the active zone, which changes the phase of a light beam from a first phase to a second phase to facilitate switching propagation of the light beam from a first branch to a second branch of the respective splitter.

Depending on the magnitude of the induced RI, the light stream entering into one of waveguides can continue propagation through the waveguide or be switched to another waveguide. A disadvantage of this approach is the heating and cooling operation required during the poling operation has to be closely controlled in terms of the temperature above the glass transition temperature and also the rate of heating to, and cooling from, the temperature, as well as ensuring the heating and cooling operation is confined to the waveguide region and does not extend into the adjacent regions which will subsequently form the cladding layer having an RI=$n_{plate}$. Heating of the active zone can be performed by means such as a powerful microheater with a rapid rate of heating, however, the cooling operation can result in unwanted heat dissipation into the cladding region. Further, temperature control of the active region is required during operation of the switch as a shift in operating temperature can result in a shift in the RI of the active region being such that a light beam is directed to the incorrect waveguide.

Another conventional approach is an all-optical switch comprising a pair of waveguides which are within evanescent coupling distance of a microresonator, where the microresonator is in the form of a ring or disk-type (e.g., a whispering-gallery-mode (WGM) type) and heat is applied to the microresonator by means of a light source, such as a laser. In a first mode of operation (i.e., no applied heating) a light stream comprising a plurality of wavelengths propagating in a first waveguide undergoes no effect by the microresonator and continue to an exit of the first waveguide. However, in a second mode of operation where heating is applied to the microresonator, evanescent coupling can cause excitation in the first waveguide, where fluctuation in the microresonator disk can generate a fluctuation in the wavelength of the light stream from a first wavelength (e.g., the wavelength occurring when no heat is applied) to a second wavelength (note: that wavelengths other than the first or second wavelength comprising the light stream continue unaffected). Hence, a wavelength in a light stream can be extracted from a first waveguide (e.g., a throughput channel) and a corresponding light stream of a second wavelength can be generated in a second waveguide (e.g., a dropout channel).

As with the previously mentioned X or Y-splitter approach, however, localized heating and cooling of a polymeric material (e.g., comprising the microresonator) is applied to effect a change in RI in the active zone of the waveguide, where, with extended operation, the efficiency with which the heat activating the thermal shifting of the microresonator may be hindered owing to overall heating of the switch system which leads to incorrect operation of the switch, e.g., the desired wavelength light stream does not undergo a wavelength capture operation or a light stream of an incorrect wavelength may be generated. Further, the aforementioned systems are difficult and expensive to manufacture.

A further approach is a plate comprising parallel waveguides having a mutually perpendicular direction formed in an optically transparent region possessing electro-optical or/and acoustic-optical properties. The RI of the plate as a whole=$n_{cladd}$, while portions of the plate used as core waveguides have an RI=$n_{core}$>$n_{cladd}$. Increasing the RI of the core portions can be achieved by ion implantation/bombardment to form the waveguide core, while any portions of the plate not undergoing implantation act as cladding media. Electrodes can be placed at a waveguide junction to facilitate application of an electrical voltage to redirect a particular wavelength in the light stream, e.g., by adjusting the RI of the waveguide at the junction. By utilizing electrode(s) of a specific shape, e.g., a plurality of fingerlike extensions, a diffraction grating can be formed where a light stream of a particular wavelength can be extracted at a first finger electrode while a light stream of another wavelength can be extracted at a second finger electrode, producing a diffraction effect. By controlling the gap between adjacent fingers of an electrode(s) and further adjusting the electric voltage between the electrode fingers, different wavelength light (and corresponding color, if applicable) can be extracted from a light stream in a first waveguide and directed towards a second waveguide, at the end of which a device can be located, such as one or more pixels in a visual display system, a photosensitive element, etc. The electrodes can be in a curved form in a planar direction, and can hence act to bend the light stream through a given angle. While only a particular degree of bending can be obtained at an electrode, by forming electrodes with a plurality of bends, the light stream can be bent through a greater total angle than is achievable by a single electrode alone. The bent electrode approach is termed a total internal reflecting (TIR) optical energy redirector.

Figure 1A:
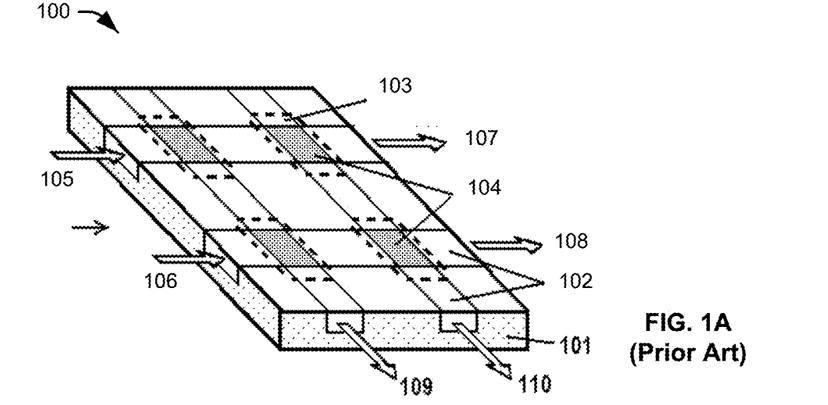
FIG. 1A illustrates a conventional waveguide system.

An example of a conventional waveguide system 100 is illustrated in FIG. 1A. A substrate 101 is formed from a transparent material having electro-optical properties, where the base material 101 has a RI=$n_1$. Ion implantation/bombardment forms a plurality of waveguide regions 102, where the waveguide regions have a RI=$n_2$, where $n_2 > n_1$, with base material 101 acting as cladding material for waveguides 102. At regions 103, where the waveguides 102 cross, electrodes 104 can be placed to facilitate formation of switching regions at 103, where electrodes 104 can be placed on either side of a waveguide, with the waveguide sandwiched therebetween. To minimize light loss in the electrode region, a layer of dielectric material of ~10 nm in thickness can be used as a cladding material. Where no voltage is applied by the electrodes, any light stream entering at 105 or 106 will be unaffected with regard to direction and will exit the respective waveguides at 107 or 108. Where voltage is applied by the electrodes, any light stream entering at 105 or 106 will be affected with regard to direction and will exit the waveguides at 109 or 110, respectively.

Figure 1B:
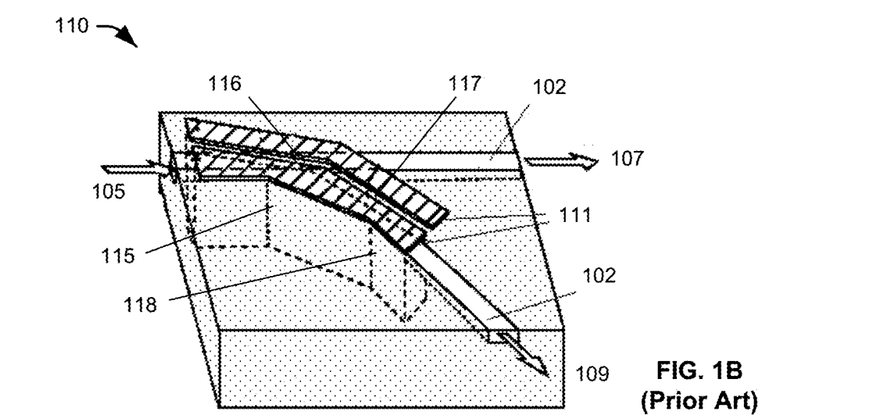
FIG. 1B illustrates example switching for the conventional waveguide system using bent electrodes and TIRs.

Turning to FIG. 1B, an example waveguide system 110 of the waveguide system 100 is illustrated comprising waveguides 102, with bent electrodes 111 placed to effect redirection of a light stream entering waveguides 102 at input 105. Example waveguide system 110 comprises two TIR reflectors comprising electrodes 116 and 117 and domain regions 115 and 118. In a state of no voltage being applied to any of 115-118, a light beam entering waveguides 102 at input 105 will continue unaltered to exit at 107. However, the TIR reflector regions act to reflect the light stream to a greater degree than is achievable by the electrodes alone and hence a light stream can be directed to the other waveguide 102 and exit at 109. Such an approach is comparable to the aforementioned Y-splitter apparatus.

Figure 1C:
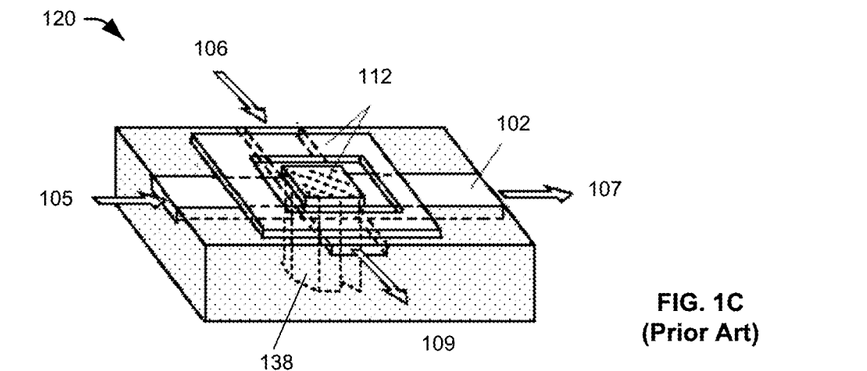
FIG. 1C illustrates example switching for the conventional waveguide system that redirects a light stream based on domain polarization.

Another example waveguide system 120 of the waveguide system 100 is presented in FIG. 1C, where, in an unenergized state, a light stream can enter a waveguide 102 at either 105 and pass unaltered through to 107 or enter at 106 and pass through to 109. However with a voltage applied at electrodes 112, a light stream entering at 105 is redirected to output 109, or a light stream entering at 106 is redirected to output 107. The redirection of the light stream is effected by polarization of domain 138, whereby the polarization effect results in formation of a polarized wall, having a different RI to that of the unpolarized state, which acts to reflect the light stream through 90°. Such an approach is comparable to the aforementioned X-splitter apparatus.

Example systems 110 and 120 use a domain that changes RI and polarization in the presence of an electric field, and thereby issues relating to thermal effects are negated. However, systems 110 and 120 incur the high costs of a monocrystal layer having a very high uniformity of structure, the difficult capability to achieve small device size, the technological complexity required for formation of switching elements, and further, the difficulty of incorporating a small-sized switch with a set of standard input and output waveguides for which switching it is intended.

SUMMARY

The following presents a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is presented later.

In accordance with one or more embodiments and corresponding disclosure, various non-limiting aspects are described in connection with directing one or more light streams. In an exemplary, non-limiting embodiment, a waveguide system is described for routing of one or more light streams, the system comprising a first waveguide and a second waveguide. The waveguides can comprise optical material, where the first waveguide can be configured to convey a light stream in a first conveying direction and the second waveguide can be configured to convey the light stream in a second conveying direction, with the first conveying direction and the second conveying direction being divergent. The system can further comprise a switching element located between the first waveguide and the second waveguide. The switching element can comprise optical material having a plurality of pores filled with liquid crystal material, where the liquid crystal material can have a higher refractive index (RI) than the RI of the optical material. In an exemplary, non-limiting embodiment, the optical material can be any of polyethylene terephthalate, polyethylene terephthalate glycol-modified, a cyclic olefin copolymer, and the like. In another exemplary, non-limiting embodiment the liquid crystal material can be a nematic liquid crystal, a ferroelectric liquid crystal, a polymeric liquid crystal, or other suitable material. The liquid crystal can have a molecular structure such that the molecules can be in a passive state alignment when no electrical voltage is being applied to the liquid crystal material and can be in an active state alignment when an electrical voltage is being applied to the liquid crystal material.

In another exemplary, non-limiting embodiment, a method is described that can facilitate directing one or more light streams. The method includes identifying regions in a waveguide plate to operate as a first waveguide, a second waveguide, a cladding material region, and a switching element region. The first waveguide and the second waveguide can be aligned to be antiparallel and located on opposite sides of the switching element region. The method can further include modifying the cladding material region and the switching element region by bombarding with ions, wherein the bombarding generates micropores in the cladding material region and the switching element region. The method can further include modifying the switching element region by etching to enlarge the micropores to form pores, where the pores can be filled with liquid crystal material. In another exemplary, non-limiting embodiment, an electrical voltage can be applied to the liquid crystal material to facilitate aligning a plurality of molecules comprising the liquid crystal material from a passive state alignment to an active state alignment. The active state alignment can cause a light stream, incident upon the switching element region from the first waveguide, to be redirected to the second waveguide via the switching element region.

In another exemplary, non-limiting embodiment, a method is described that can facilitate directing one or more light streams as a function of a refractive index. The method includes identifying a first wavelength stream in a light stream comprising a plurality of wavelengths. A determination can be made to identify a refractive index that facilitates redirecting the first wavelength stream to a direction of travel divergent from a direction of travel of the light stream. Further, a determination can be made of a refractive index by applying an electrical voltage to a switching element comprising liquid crystal filled pores in optical material relative to a refractive index of the optical material without the liquid crystal filled pores. The light stream can then impinge on the switching element, where under the influence of applying the electrical voltage to the switching element, diverting the first wavelength stream can occur in the direction of travel divergent from the direction of travel of the light stream.

DETAILED DESCRIPTION

The various embodiments are now described with reference to the drawings, wherein like reference numerals are used to refer to like elements throughout. In the following description, for purposes of explanation, numerous specific details are set forth in order to provide a thorough understanding of the various embodiments. It can be evident, however, that the various embodiments can be practiced without these specific details. In other instances, well-known structures and devices are shown in drawing form in order to facilitate describing the various embodiments.

Liquid Crystal Waveguide Architecture

The subject disclosure presents various systems and methods relating to directing a light stream, or at least one wavelength portion(s) thereof, between an input(s) and an output(s) of a waveguide switching system enabling improved construction and operation. For example, the waveguide plate can be constructed from commercially available polymeric(s), formation of waveguides in the plate is made easier, and further, methods of joining existing light transmission systems (e.g., fiber optics) to the waveguide input(s) and output(s) are readily available. The waveguide switching system in conjunction with photosensitive components, etc., can comprise an optical communication system, a display system, or other system suitable for incorporation of the various exemplary, non-limiting embodiments presented herein.

It is to be appreciated that the term switching element, as used herein, not only relates to formation of a structure to facilitate extraction/diversion of at least one wavelength ($\lambda$) light stream from a plurality of wavelengths comprising a light stream, but can also be applied to a structure which utilizes a diffraction process to facilitate extraction/diversion of at least one wavelength light stream.

Figure 2A:
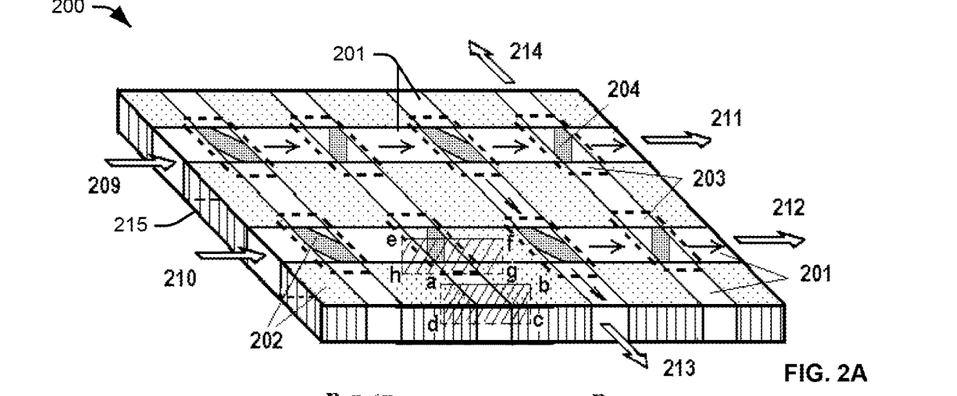
FIG. 2A shows exemplary, non-limiting embodiments of the light waveguide system of the present application.

FIG. 2A illustrates an exemplary, non-limiting embodiment of a waveguide system 200 to facilitate directing passage of at least a wavelength portion of a light stream through a waveguide plate. Waveguide plate 215 (hereinafter 'plate') comprises a plurality of waveguides 201 through which a light stream (e.g., any of light streams 209 or 210) is directed, and based upon whether optical switching is applied, the light stream passes through the waveguides unaltered (e.g., light stream 209 exits at 211, light stream 210 exits at 212) or is directed along an alternate path (e.g., light stream 209 exits at 214, light stream 210 exits at 213).

The alternate paths can be aligned in a divergent or antiparallel manner to the incident waveguides (e.g., alignment of the waveguide conveying light stream 209 relative to the orientation of the waveguide conveying light stream 214). The waveguides 201 can be comprised of optically transparent material having an RI=n, with the waveguides being bounded by adjacent cladding regions 202. Plate 215 can be formed from any suitably transparent material such as an optically isotropic polymeric material, for example, optically isotropic polyethylene terephthalate (PET), polyethylene terephthalate glycol-modified (PETG), cyclic olefin copolymers (TOPAS), etc.

Figure 2B:
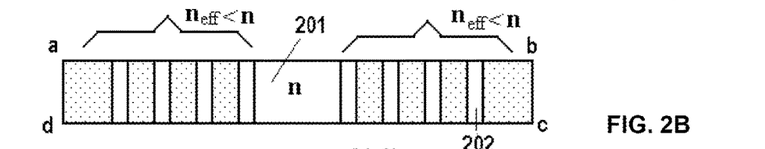
FIG. 2B is a cross section view illustrating exemplary, non-limiting embodiments of the light waveguide system of the present application, including waveguide and adjacent cladding media.

The cladding regions 202 can be formed by ion implantation/bombardment process, wherein the waveguides 201 are protected during the process. In such an embodiment, the exposed portions of the initial plate 215 can be modified by the passage of the ions such that a structure of broken tracks can be formed in the exposed plate material to form the cladding regions 202, where the broken tracks are termed 'micropores' herein to be contrasted with the larger 'pores' of the switching elements described further herein (as illustrated in FIG. 2B, a section thru abcd of FIG. 2A). Owing to the modified structure, the cladding regions 202 (e.g., comprising removal of material from the exposed plate regions by the ion bombardment to form the micropores) have an effective RI=$n_{\textit{eff}}$, where $n_{\textit{eff}}$<n of the waveguides 201. The difference in RI between n and $n_{\textit{eff}}$ can be in the order of 0.1-0.2, which is higher than is achievable by conventional techniques. Owing to the difference in RI, a light stream (e.g., light stream 209) is confined to the waveguide 201 by the adjacent cladding regions 202.

Figure 2C:
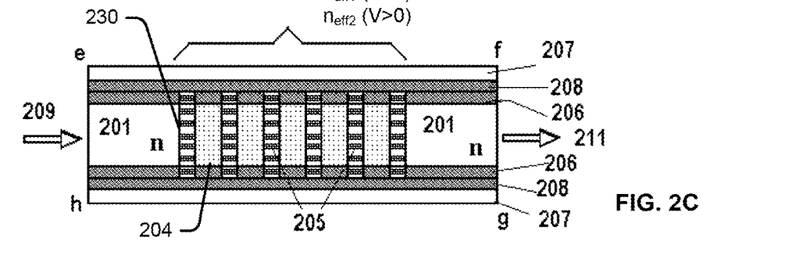
FIG. 2C is a cross section view illustrating exemplary, non-limiting embodiments of an active zone of the light waveguide system of the present application.
Figure 2D:
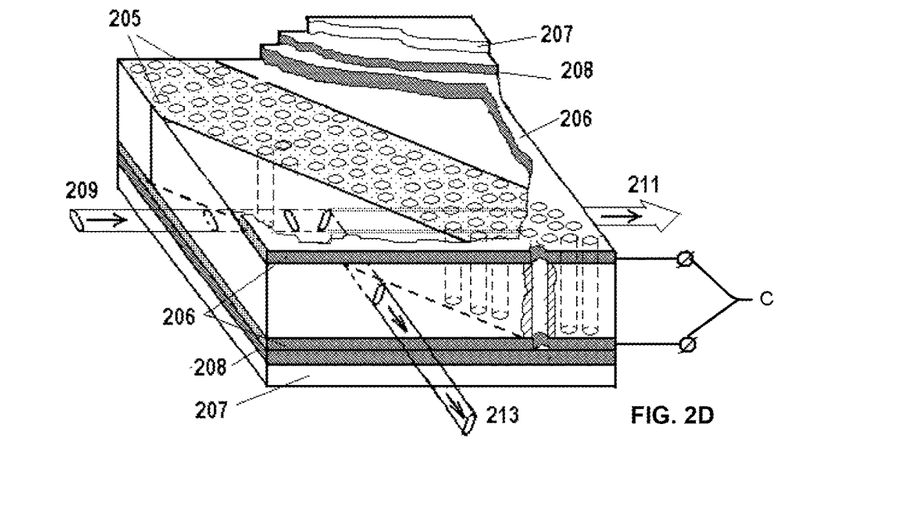
FIG. 2D is a sectional view illustrating exemplary, non-limiting embodiments of a switching element of the light waveguide system of the present application.

Further illustrated in FIG. 2A are switching elements 204, which can be comprised of a plurality of pores 230 (see, e.g., FIG. 2C) filled with a liquid crystal 205 (see, e.g., FIG. 2D; also, formation of pores is explained further below with reference to FIGS. 9A and 9B), with electrode regions 203 (broken line regions in FIG. 2A) identified with respect to the switching elements. Liquid crystal (LC) 205 can be of any suitable material, e.g., a nematic LC having a positive dielectric anisotropy, a ferroelectric LC, a polymeric LC, etc. As illustrated in FIG. 2C, a section on efgh of FIG. 2A is shown. In this regard, waveguides 201 comprising the basic plate material (e.g., PET) have an optical switching element 204 comprising pores 230 filled with LC 205. The optical switching element 204 can be sandwiched between waveguide transparent electrodes 206 (e.g., comprising of any suitable material, e.g., indium dioxide (ITO)). Transparent electrodes 208 and a polymeric film 207 can be further formed on either side of, and in electrical contact with, transparent electrodes 206 to form the electrode regions 203. During formation of the pores 230, a portion of transparent electrodes 206 may be removed and hence the transparent electrodes 206 can have a net-like structure after pore formation. By capping the transparent electrodes 206 with transparent electrode layer 208, any voltage applied to the electrodes 206 and 208 can be evenly distributed throughout. The structure of transparent electrodes 206 and 208 in conjunction with polymeric film 207 provides a homogeneous electric field in the LC 205 filled pores 230. Polymeric film 207 can have a thickness in the order of 10 micrometers.

As illustrated in FIG. 2C, in a non-energized state, where no electrical voltage (e.g., voltage) is applied across the electrodes 206 and 208, LC 205 in an un-energized state with the molecules comprising LC 205 being in an initial condition (as illustrated further below with reference to FIGS. 3A-3D) with an RI=$n_{\textit{eff}1}$ as electric voltage V=0 ('passive' mode). However, when a voltage is applied across electrodes 206 and 208, the alignment of the molecules in LC 205 is adjusted with an according change in the RI=$n_{\textit{eff}2}$ as electric voltage V>0 ('active' mode). As described further below, by altering the magnitude of electric voltage placed across electrodes 206 and 208, the RI=$n_{\textit{eff}2}$ can be adjusted to facilitate different refraction indices and hence the ability to direct a wavelength of light through a given angle as well as extract a particular wavelength light stream from a plurality of wavelengths comprising a light stream. The LC separating concept is further illustrated in the exemplary, non-limiting embodiment illustrated in FIG. 2D, where in the electric voltage V=0 condition with RI=$n_{\textit{eff}1}$, the direction of light stream 209 is effectively unaltered (apart from minor refraction described further below) and the light stream exits the waveguide structure at 211. However, in the electric voltage V>0 condition across C at electrodes 206 and 208, the re-orientation of molecules in LC 205 cause light stream 209 to be refracted and/or reflected in direction 213, with RI=$n_{\textit{eff}2}$.

In a further exemplary, non-limiting embodiment, the configuration shown in FIG. 2C can also be utilized in a modulating environment where the LC 205 in the filled pores 230 can be activated in an on-off-on-off manner to facilitate modulation of an outgoing light stream (e.g., light stream 209). Such modulation can be utilized to facilitate pulsed data, etc., being transmitted in an outgoing light stream, e.g., light stream 213.

Figure 3A:
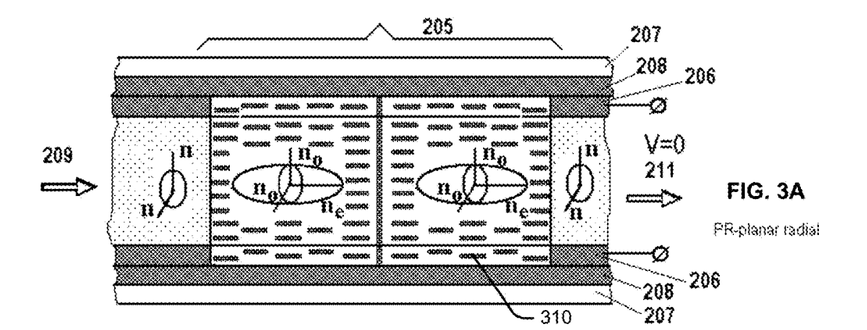
FIG. 3A is a drawing illustrating exemplary, non-limiting embodiments of a planar radial initial LC orientation in a pore.

As illustrated in FIGS. 3A-3D, depending upon the composition of the material comprising plate 201, the structure of LC's 205 and the molecular structure 310 of the LC material, a plurality of configurations are available for the switching regions 204, including:

FIG. 3A—planar radial with a disclination in the center (planar radial PR).

Figure 3B:
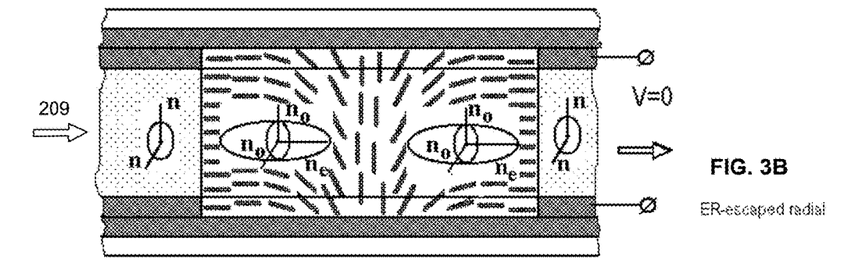
FIG. 3B is a drawing illustrating exemplary, non-limiting embodiments of an escaped radial LC orientation in a pore.

FIG. 3B—deformed radial (escaped radial ER).

Figure 3C:
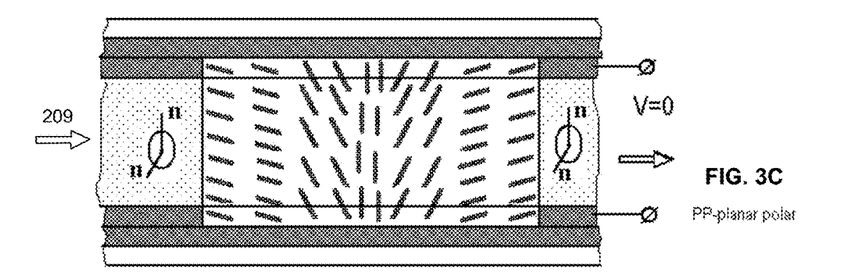
FIG. 3C is a drawing illustrating exemplary, non-limiting embodiments of a planar polar LC orientation in a pore.

FIG. 3C—planar polar (PP).

Figure 3D:
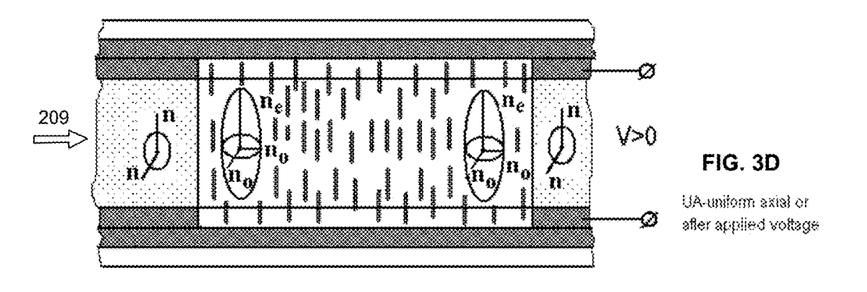
FIG. 3D is a drawing illustrating exemplary, non-limiting embodiments of a uniform axial LC orientation in a pore.

FIG. 3D—homogeneous axial (uniform axial—UA), where this orientation can also be formed by applying an operating voltage to the LC, as noted by comparison between the direction of $n_e$ of FIG. 3D in comparison with FIGS. 3A and 3B.

With respective FIGS. 3A-3D, $n_o$ and $n_e$ indicate directions of isotropy resulting from alignment of the molecules comprising LC 205. Where a given RI can be a function of the RI of the material surrounding a pore (e.g., n of the plate material), pore diameter, density of distribution of the pores, values of RI of the LC ($n_o$ and $n_e$), etc.

Figure 4A:
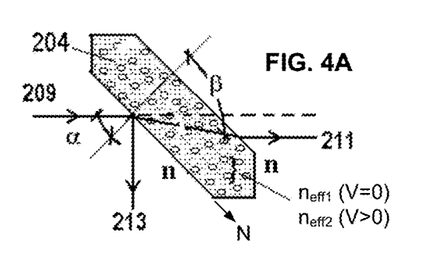
FIG. 4A is a drawing illustrating exemplary, non-limiting embodiments of a switching element of a light waveguide system.
Figure 4B:
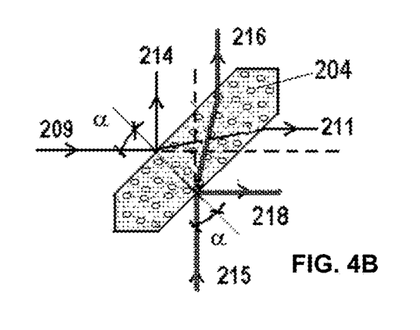
FIG. 4B is a drawing illustrating exemplary, non-limiting embodiments of a switching element of a light waveguide system.
Figure 4C:
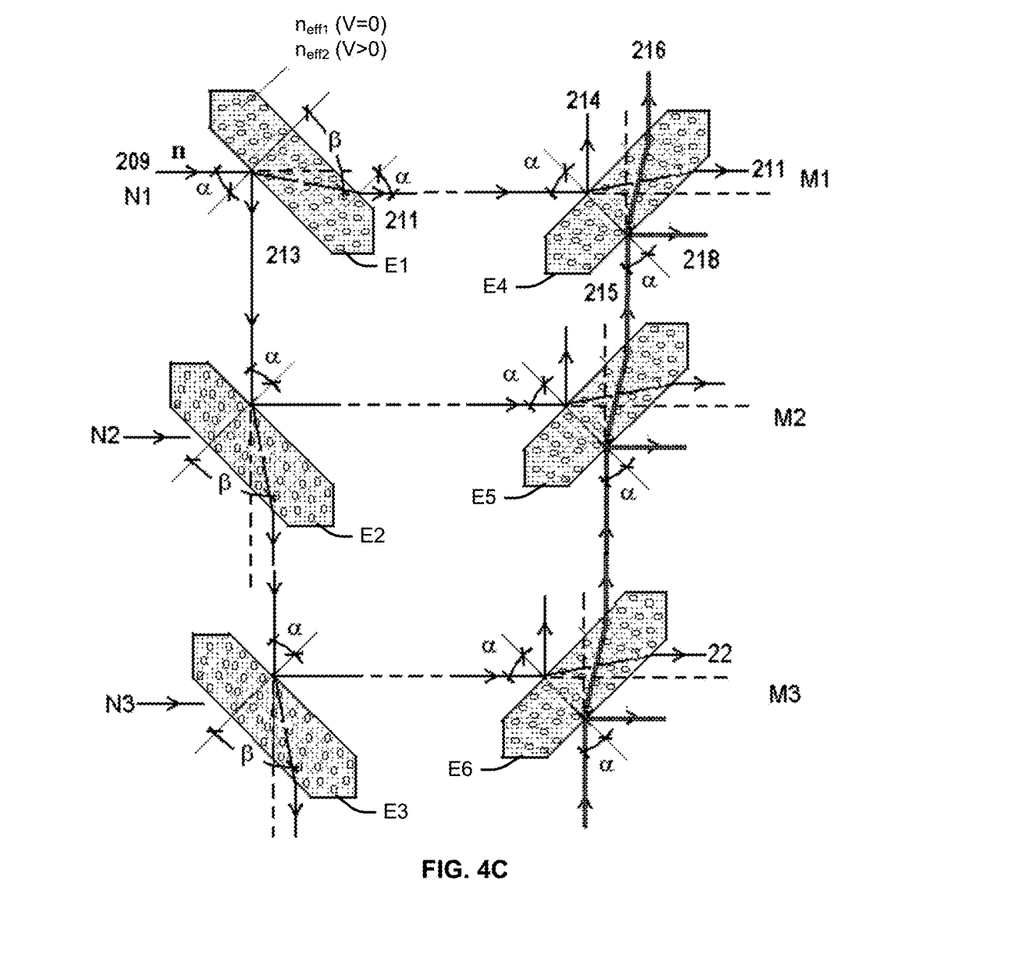
FIG. 4C is a drawing illustrating exemplary, non-limiting embodiments of a plurality of switching elements in a light waveguide system.

FIGS. 4A-C illustrate a plurality of exemplary, non-limiting embodiments of a waveguide system to facilitate directing passage of at least a wavelength portion of a light stream through a waveguide plate. FIGS. 4A-C further develop concepts presented earlier, particularly with reference to FIGS. 2A and 2D. As illustrated in FIG. 4A, a light stream 209 is incident on switching element 204, where the switching element 204 can be placed with specific alignment to the direction of light stream 204. As shown, the LC's 205 comprising switching element 204 can be in an unexcited (electric voltage V=0) condition with RI=$n_{\textit{eff}1}$, and light stream 209 passes through switching element 204 with an effectively unaltered direction 211. Light stream 209 approaches switching element 204 from the optically dense material of waveguide 201 which has a RI=n, and the light stream 209 is incident on the less optically dense material comprising switching element 204, where the angle of incidence of light stream 209 with reference to the surface of switching element 204 is α. As light stream 209 exits the less optically dense material (RI=$n_{eff1}$) comprising switching element 204 to the more dense (RI=n) waveguide material 201, the light stream undergoes further refraction to produce light stream 211. Owing to the difference in RI of material comprising waveguide 201 and switching element 204, the light stream undergoes a small degree of refraction (total angle β) upon entry and upon exiting the switching element 204, with a resulting slight displacement along exiting light stream 211.

The degree of displacement between the position of the entering light stream 209 and the exiting light stream 211 is a function of equation 1:

$$n \sin \alpha = n_{eff1} \sin \beta \quad [\text{Eq. 1}]$$

Further, the degree of displacement can also a function of the thickness (or width) of switching element 204, where for a thicker section of switching element 204 the distance the light stream has to travel through the switching element 204 is increased and hence the position of 211 in relation to 209 is greater than for a thinner section of switching element 204.

Further, the intensity of the refracted light stream will also decrease slightly, i.e., the intensity of incident light stream 209 will be slightly higher than the exiting refracted light stream 211. In a situation where a light stream is passing through two materials with high optical difference, e.g., glass (RI=1.52) and air (RI=1.003) a difference in intensity in the order of 5-6% will occur. However, given the similarity of the base material comprising both the waveguide 201 material and the switching element 204 material (e.g., both comprise a base element of PET material) in conjunction with the LC 205 filled pores 230 a change in intensity in the order of only 2-3% will be experienced.

It is to be noted that the combination of α and $n_{eff}$ can be controlled/selected such that the refraction angle β becomes 90°, whereby equation 1 becomes:

$$n \sin \alpha = n_{eff1} \sin 90° = n_{eff} \quad [\text{Eq. 2}]$$

When the conditions expressed in Equation 2 are satisfied, light stream 209 will be redirected such that the light stream 209 will travel along the interface between the waveguide 201 material and the switching element 204 material in direction N. Further, for conditions of refraction angle β>90° light stream 209 will be reflected by the surface of the switching element 204. Hence, a voltage defining $n_{eff}$ can be applied at the electrodes 206 and 208 such that a effective refractive index of $n_{eff2}$ is less than n sin α. In a situation where complete reflection occurs, e.g., light stream 209 is reflected as light stream 213, the light stream can be direction along a waveguide perpendicular to the original waveguide direction, e.g., as shown on FIG. 2A by arrows for light stream 209 being directed towards light stream 213. Hence, by utilizing a waveguide comprising LC 205 filled pores 230 by adjusting the applied electrical voltage a light stream 209 can pass through a switching element 204 with minimal refraction and/or loss of intensity as light stream 211, as well as under different conditions is reflected as a light stream 213 with practically the same intensity as the original light stream 209 and with partial polarization. Thus, light stream 209 can be directed through two directions (e.g., between direction 211 and 213).

Hence, as shown by FIG. 4C, the various operating conditions and resulting effects make the switching element 204 and LC 205 filled pores amenable to a multistage switching system, where a light stream 209 can undergo a plurality of refraction and/or reflection operations as light stream 209 is incident on each switching element E1, E2, E3. As previously mentioned, all or a portion of a light stream can be incident upon a switching element 204 where one or more wavelengths can be extracted from a light stream and directed through the plurality of switching elements 204 or directed to devices connected to the waveguide system 200. As shown in FIG. 4C, from an initial light stream 209 portions (e.g., wavelengths) can be refracted and travel trough E1-E3, while other portions can be reflected to be incident on E4-E6 where further refraction and reflection operations can be performed.

As illustrated in FIG. 4B, the alignment of the switching element 204 can be configured as desired to facilitate reflection and/or refraction of a light stream both in the presence and absence of an electrical voltage acting on the LC 205 filled pores. FIG. 4B illustrates a switching element 204 being rotated through 180°, with light stream 209 being reflected in direction 214 (per the direction 214 of FIG. 2A) accompanied by refraction in direction 211 which is horizontally offset compared with direction 211 shown in FIG. 4A.

Further, a plurality of light streams can be refracted/reflected concurrently. As shown in FIG. 4B, light stream 209 can remain in a first slightly shifted direction 211 or can be reflected in direction 214, while a second light stream 215 can remain in a first slightly shifted direction 216 or can be reflected in direction 218, where directions 214 and 216 are parallel and similarly directions 211 and 218 are also parallel. A combination of switching elements 204 as depicted in FIGS. 4A and 4B can be combined to construct a waveguide system for routing N input channels (E1-E3) to M output channels (E4-E6), as single or a plurality of light streams e.g., in the exemplary, non-limiting embodiment, N=M=3.

Figure 5:
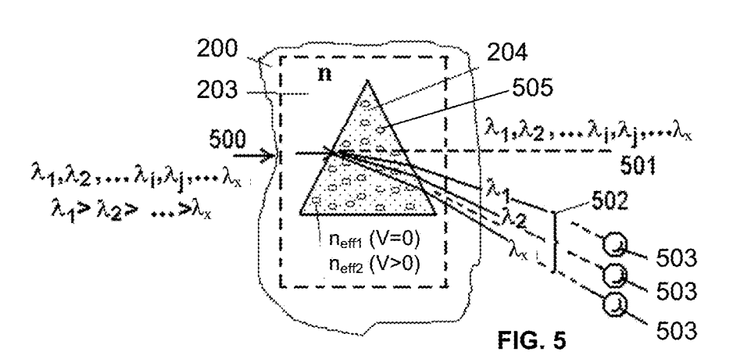
FIG. 5 is a drawing illustrating an exemplary, non-limiting embodiment of a switching element in prism form.

While the foregoing discussion has presented a switching element 204 in a strip-like form, other switching element forms can be utilized. For example, as illustrated in the exemplary, non-limiting embodiment presented in FIG. 5, the switching element 204 can have a triangular (e.g., flat prism) form positioned in electrode switching region 203. For switching element 204, the effective RI=$n_{eff1}$ in the absence of an applied electrical voltage is equal to n (i.e., the RI of the plate 200, plate waveguide). Hence, for example, a light stream 500 of white light will proceed in direction 501. However, under the application of an electric voltage on LC 505, filled pores switching element 204 can operate as a prism whereby incident light stream 500 can be refracted to separate out the respective wavelength components $\lambda_1, \lambda_2, \ldots \lambda_i, \lambda_j, \ldots \lambda_x$, where j, and x are positive integers. Hence, by application of a switching element in a flat prism form a white light stream 500 can be broken down into its respective color components 502. Further, the respective color components $\lambda_1, \lambda_2, \ldots \lambda_x$ can be directed toward/received at respective photosensitive elements 503, where each of the photosensitive elements 503 can be configured to operate upon receipt of a particular wavelength(s) of light being incident upon the respective photosensitive element. Switching element 204, electrode switching region 203, and photosensitive elements 503 can comprise an optical communication system, display system, and the like.

Figure 6:
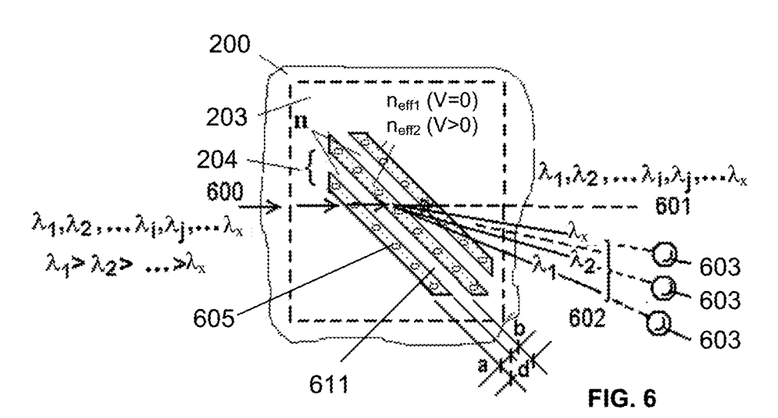
FIG. 6 is a drawing illustrating an exemplary, non-limiting embodiment of a plurality of switching elements in the form of a diffraction grating.

FIG. 6 illustrates an exemplary, non-limiting embodiment comprising a plurality of switching elements 204 (thickness a) separated by polymeric material, e.g., PET, (thickness b) as utilized for a waveguide (as previously described) having an RI=n. The plurality of switching elements 204 are positioned in electrode switching region 203, and comprise a plurality of LC 605 filled pores, having a RI=$n_{eff1}$ in the absence of an electrical voltage applied to the electrodes (not shown) and a RI=$n_{eff2}$ with the application of an electrical voltage, where $n_{eff1}$=n and $n_{eff2}\neq$n. Hence, in the absence of electrical voltage, where $n_{eff1}$=n, the incoming light stream 600 comprising wavelengths $\lambda_1, \lambda_2, \ldots \lambda_i, \lambda_j, \ldots \lambda_x$ passes through switching element 204, for example to be reflected/refracted by a subsequent switching element(s). Upon application of a electrical voltage, where $n_{eff2}\neq$n, the array of switching elements 204 interspersed with separation material 611 with a periodicity of a+b=d, the structure acts as a diffraction grating and acts to diffract/disperse light stream 600 into constituent component wavelengths $\lambda_1, \lambda_2, \ldots \lambda_i, \lambda_j, \ldots \lambda_x$, each wavelength being diffracted at a respective angle at 602, with light streams being incident upon respective photosensitive elements 603. Switching element 204, separation material 611, electrode switching region 203, and photosensitive elements 603 can comprise an optical communication system. An exemplary, non-limiting application of such an optical communication system can be the selection of desired wavelength(s) from a light stream comprising a plurality of wavelengths.

Figure 7:
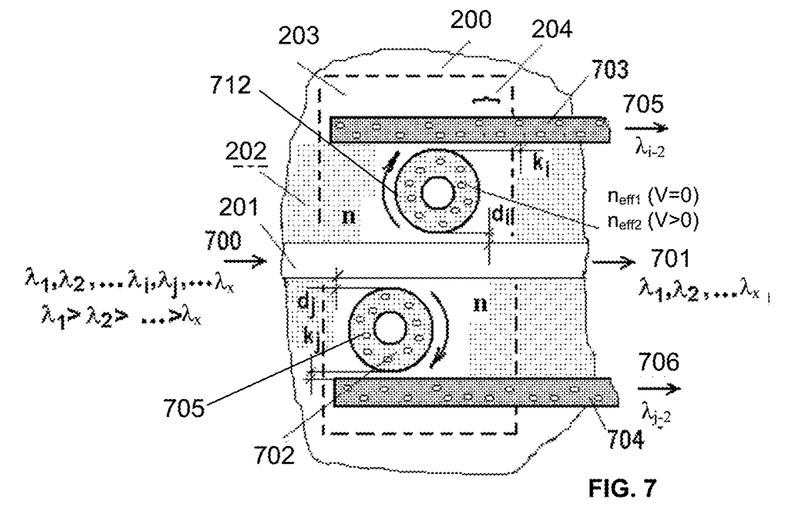
FIG. 7 is a drawing illustrating an exemplary, non-limiting embodiment of a switching element comprising a micro resonator.

Another feature of a light management system can be an ability to extract a particular frequency wavelength from a plurality of wavelengths, while the remainder of the light stream continues on through to subsequent component(s) of an optical system. FIG. 7, illustrates an exemplary, non-limiting embodiment comprising ring switching elements 712 and 702 which can operate in a similar fashion to a microresonator(s). Ring switching elements 712 and 702 comprise LC 705 filled pores, which can be connected to transparent electrodes as marked by boundary 203. A light stream 700 propagates through waveguide 201 to exit at 701. In a first embodiment, where no electrical voltage is applied to the ring switching elements 712 or 702, the RI=$n_{eff1}$=n (e.g., for V=0) and thus the initial light stream 700 comprising $\lambda_1, \lambda_2, \ldots \lambda_i, \lambda_j, \ldots \lambda_x$, passes along waveguide 201 with exiting light stream 701 also comprising $\lambda_1, \lambda_2, \ldots \lambda_i, \lambda_j, \ldots \lambda_x$. However, when an electrical voltage is applied to the ring switching elements 712 and/or 702, RI=$n_{eff2}\neq$n (e.g., for V>0), initial light stream 700 comprises $\lambda_1, \lambda_2, \ldots \lambda_i, \lambda_j, \ldots \lambda_x$, while exiting light stream 701 comprises only $\lambda_1, \lambda_2, \ldots \lambda_x$, as illustrated, wavelengths $\lambda_i$ and $\lambda_j$ are not present in the exiting light stream 701. Further, as illustrated, ring switching elements 712 and 702 can be set a respective distance from waveguide 201, ring switching element 712 at distance $d_i$ and ring switching element 702 at distance $d_j$. Distances $d_i$ and $d_j$ can be a function of a plurality of parameters which can include the width of waveguide 701201 geometry of the ring switching elements 712 and 702, a difference in RI between the surrounding material (e.g., material 202) and the effective RI (e.g., $n_{eff2}$) of the ring switching element (e.g., 712 or 702), and other related parameters.

As the aforementioned parameters are adjusted, e.g., change in electrical voltage on ring switching elements (e.g., 712 or 702), specific wavelengths can be 'extracted' from light stream 700. As illustrated, parameters affecting ring switching element 712 result in a wavelength $\lambda_i$ being detected in the light stream 700 (e.g., this is the wavelength for which the ring switching element is configured to extract and will only extract wavelength $\lambda_i$ when it is present in light stream 700). By virtue of operation of ring switching element 712, the intensity of the light stream at wavelength $\lambda_i$ results in a complimentary wavelength $\lambda_{i-2}$ being generated in waveguide 703, and exiting as light stream 705 with wavelength $\lambda_{i-2}$. A similar procedure can be conducted at ring switching element 702, with extraction of wavelength $\lambda_j$ giving rise (via waveguide 204) of a lightbeam 706 of wavelength $\lambda_{j-2}$. In an exemplary embodiment, photodetectors can be placed at the end of light streams 705 and/or 706 to facilitate detection and reading of information contained in light streams 705 and/or 706 (and hence in initial light stream 700). In an embodiment, a plurality of ring electrodes can be utilized to facilitate extraction of a plurality of wavelengths from an initial light stream, e.g., initial light stream 700. In such an embodiment, an initial light stream 700 can be reduced from a plurality of wavelengths down to one or more desired wavelengths, e.g., in light stream 700 comprising $\lambda_1, \lambda_2, \ldots \lambda_i, \lambda_j, \ldots \lambda_x$, only $\lambda_1, \lambda_2, \ldots \lambda_x$ (e.g., to reduce transmission bandwidth) and hence $\lambda_i$ and $\lambda_j$ can be extracted from outgoing light stream 701.

Figure 8A:
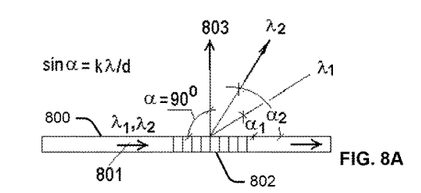
FIG. 8A is a drawing illustrating an exemplary, non-limiting embodiment of operation of a switching element.

As previously described, and with reference to the exemplary, non-limiting embodiments presented in FIGS. 8A-E, as a light stream passes between an inlet and an outlet (e.g., FIG. 8A, light stream 801) a diffraction grating (e.g., FIG. 8A, grating 802) can be utilized to extract particular light wavelengths (e.g., FIG. 8A, $\lambda_1, \lambda_2$) from the incident light stream 801, with the extracted wavelengths being extracted are at particular angles of diffraction (e.g., FIG. 8A, $\lambda_1$ at $\alpha_1$ and $\lambda_2$ at $\alpha_2$) in accordance with the following, Equation 3:

$$\sin \alpha = k\lambda/d \qquad [\text{Eq. 3}]$$

where $\alpha$ is the diffraction angle for a given wavelength $\lambda$, k is the diffraction order, and d is the period of the diffraction grating (e.g., d=a+b as shown in FIG. 8D). In an example, as shown in FIG. 8A, where the wavelength equals the diffraction grating periodicity, then $\alpha=90°$, with the light stream 803 exiting perpendicular to light stream 801.

Figure 8B:
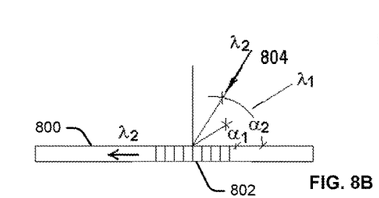
FIG. 8B is a drawing illustrating an exemplary, non-limiting embodiment of inputting light into a switching element.

Based on the foregoing, FIG. 8B illustrates a configuration where a light stream of a particular wavelength can be directed into a waveguide. A light stream 804 can be incident upon a diffraction grating 802 whereby light of a particular wavelength (e.g., $\lambda_2$) can be configured to be incident on the diffraction grating at a particular angle (e.g., $\alpha_2$) to facilitate refraction of the particular wavelength light into the waveguide 800, whereby the particular wavelength light can be conveyed by waveguide 800 to any other component comprising the waveguide plate, as previously described.

As further shown in FIG. 8D (which is a section AA of FIGS. 8C and 8E), a diffraction grating can comprise of a plurality of waveguide switching elements 810 (of width a), each comprising pores 805, separated by material 811 (of width b), where switching element 810 material has an effective RI=$n_{eff}$ while separating material 810 has a RI=n.

In an exemplary, non-limiting embodiment, pores 805 can remain open (e.g., simply filled with air or other gas) and as such, given the difference in refractive properties of air and waveguide material (e.g., PET) the $n_{eff}$ of such a configuration is less than n (i.e., RI=$n_{eff}$<n), and as such, a switching element 810 comprising air filled pores can operate without a requirement for an electrode(s) to excite the air within, passive mode. In another exemplary, non-limiting embodiment, pores 805 can be filled with LC (e.g., similar to LC 205 filled pores 230) and as such, given the difference in refractive properties of LC and waveguide material (e.g., PET) the $n_{eff}$ of such a configuration is greater than n (i.e., RI=$n_{eff}$>n), where the operation of switching element 810 comprising LC filled pores can operate in conjunction with an electrode(s) to facilitate excitation of the LC, as previously described, active mode. Both embodiments (i.e., with air filled pores or LC filled pores) facilitate entry of external light streams (e.g., of a given wavelength $\lambda$ and at a given angle of incidence $\alpha$) into the waveguide system. For example, in accord with Equation 3, for a $\lambda_2$ incident at angle $\alpha_2$, sin $\alpha_2 = k\lambda_2/d$, as illustrated in FIGS. 8B and 8E.

Figure 8C:
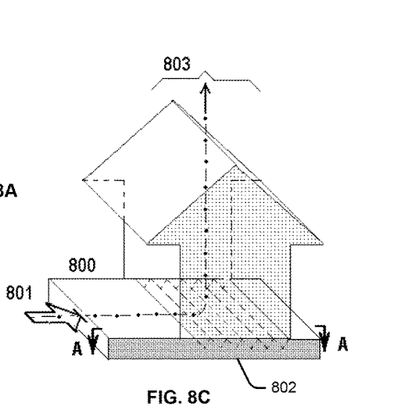
FIG. 8C is a drawing illustrating an exemplary, non-limiting embodiment of a switching element display.
Figure 8D:
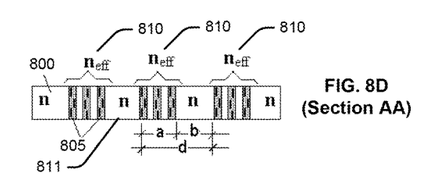
FIG. 8D is a drawing illustrating an exemplary, non-limiting embodiment of a diffraction grating.

As shown in FIG. 8C, the illustrated configuration can, in an exemplary, non-limiting embodiment, be utilized in a display device with incoming light stream 801 being diffracted and/or refracted at diffraction element 802 into component wavelengths (e.g., colors) for viewing at 803. In another exemplary, non-limiting embodiment, the respective energies carried in light 803 can be converted into electrical energy, e.g., by a photovoltaic component, or other device that can convert an incoming stream of light energy into electrical energy, and further back into light energy, as required.

Figure 8E:
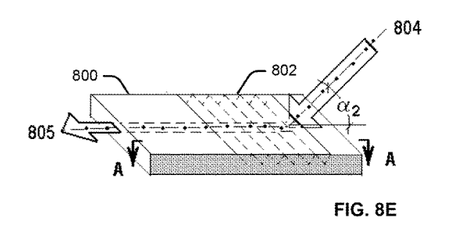
FIG. 8E is a drawing illustrating an exemplary, non-limiting embodiment of inputting light into a switching element.

Furthermore, as illustrated in FIG. 8E, the waveguide plate can be utilized to facilitate incorporation of a light stream that may not be correctly inclined for incorporation into a primary light stream apparatus but can act as a supplemental device provisioning incorporation of a light stream into the primary light stream apparatus, that under normal circumstances would not be amenable to such incorporation.

In a further exemplary, non-limiting embodiment, the configuration shown in FIG. 8E can also be utilized in a modulating environment (e.g., in conjunction with the apparatus of FIG. 2C) where, in an active configuration, the LC filled pores can be activated in an on-off-on-off manner to facilitate modulation of an incoming light stream (e.g., light stream 804), where such modulation can be utilized to facilitate formation of pulsed data, etc.

Exemplary Manufacture of a Waveguide Plate

To create micropores in optical material, at least two steps or stages can be applied to form a waveguide plate as described herein in one or more embodiments. In one step, the optical material (i.e., the whole piece of optical material) undergoes ion irradiation. Conceptually, such ions break down the molecular bonding of the material through which they pass. Since the energy required to irradiate the optical material with ions can be significant, selective exposure of different portions of the optical material is not commercially feasible.

However, micropores have not been formed at the ion irradiation stage yet. To form micropores, as another step, a chemical solution can be applied to the optical material to make pores along the region(s) with broken bonding. The refractive index of the optical material remains unchanged where the part(s) with broken bonding are not exposed with the chemical solution. As a result, a photoresist can aid to facilitate selective etching by controlling which part(s) are exposed to the chemical solution and which part(s) are not. As a result of the photoresist, pores can be selectively formed at different locations of the optical material.

Figure 9A:
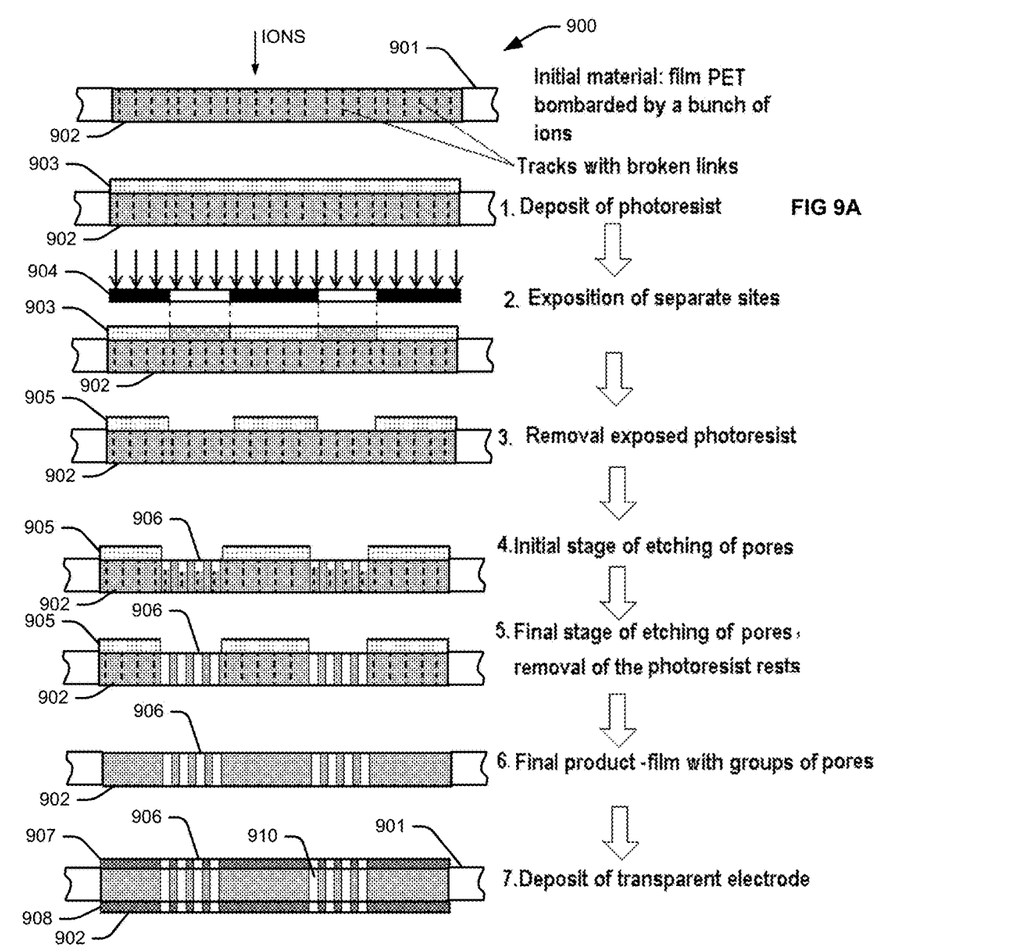
FIG. 9A is a drawing illustrating an exemplary, non-limiting embodiment of formation of a waveguide system.
Figure 9B:
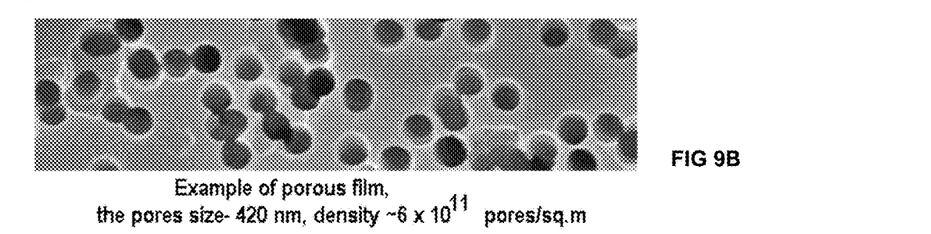
FIG. 9B is a micrograph of pores comprising a switching element according to an exemplary, non-limiting embodiment.

FIGS. 9A and 9B illustrate an exemplary, non-limiting embodiment for construction of a waveguide apparatus as previously described herein. In an initial state, a plate 900 of any suitably transparent material, such as an optically isotropic polymeric material, for example, PET, PETG, TOPAS, etc., undergoes ion irradiation (e.g., by a cyclotron). Plate 900 can be in the order of 20 μm thick. The ion bombardment results in breakage of molecules in the regions of the plate material exposed to ion bombardment. Next, as described above, a chemical solution and a photoresist can be used to selectively make micropores. Owing to the modified structure, a cladding region 902 (e.g., cladding region 202 from FIG. 2A) has an effective RI=$n_{eff}$, where $n_{eff}$ is less than the RI=n of a waveguide region 901 (e.g., waveguide region 201 from FIG. 2A). The difference in RI between n and $n_{eff}$ is in the order of 0.1-0.2, which is a higher amount than is achievable by conventional techniques. As mentioned, since the refractive index of the optical material remains unchanged where the part(s) with broken bonding are not exposed with the chemical solution, the RI of the waveguide region 901 remains unchanged.

With reference to FIG. 2A, since the entire optical material undergoes ion bombardment, while cladding region 202 undergoes ion bombardment, the switching element 204 region also undergoes ion bombardment. Next, as mentioned, a chemical solution can be applied to form micropores. An exposed portion(s) of plate 900 can be modified by the ion irradiation and subsequently the chemical solution treatment is applied such that micropores are formed in the exposed plate material to form cladding regions 902 (e.g., cladding region 202 noted above), where the micropores can have a density of about $6 \times 10^{11}$ micropores/m². However, while the micropores of cladding region 202 are in the final state for those regions, the micropores initially formed in the switching element region 204 undergo further processing to enlarge the micropores to form pores, as described further below.

At FIG. 9A-1, a layer of photoresist 903 (e.g., photoresist NIOPIK FP-383) to facilitate patterning and subsequent formation of switching element regions 204. While FIGS. 9A-1 and 9A-2 indicate the photoresist to be a positive photoresist, a negative photoresist operation can be equally applied.

At FIG. 9A-2, a mask layer 904 is utilized to pattern the photoresist layer 903, where the exposed regions of photoresist layer 903 undergo a structural modification in the presence of radiation, e.g., ultra-violet radiation.

At FIG. 9A-3, the exposed portions of photoresist layer 903 are removed to facilitate formation of a patterned layer of photoresist 905.

At FIG. 9A-4, as part of the removal of the exposed portions of photoresist layer 903, the process for removal of the exposed portions (e.g., by etching) can result in the opening up of any micropores (i.e., to form pores 906) on the surface of bombarded region 902. The operation of opening up any of the micropores can also be by a separate process to that of the photoresist layer process. For example, an etch selectivity operation can be used where a first etchant removes the photoresist layer and a second etchant acts to open up the micropores.

At FIG. 9A-5 the etching process is continued to facilitate formation of the pores 906. In an exemplary, non-limiting embodiment, an anisotropic operation can be performed to facilitate formation of the pores 906 in a vertically preferential direction. It is to be appreciated that the final diameter of pores 906 can be of any size depending on plate 900 thickness, etchant, etching time, etc., in an embodiment, the diameter of pores 906 is in the order of 420 nm.

At FIG. 9A-6 the photoresist is removed, leaving regions comprising pores 906, which can form a switching element 204. With adjacent regions of micropores 902 which as mentioned can form cladding regions 202.

At FIG. 9A-7, transparent electrodes 907 and 908 (e.g., comprising oxide indium and oxides of tin with a specific resistance of 50-100 ohm) are formed with the pores 906 being filled with LC 910 (e.g., LC E-7). Any excess LC not filling pores 906 can be removed (e.g., washed off).

FIG. 9B is a micrograph of the porous film formed by pores 906, having a pore size in the order of 420 nm diameter and a density in the order of around $6 \times 10^{11}$ pores/m².

Any suitable technique can be used to pattern any of the material layers presented herein. For example, patterning can be created by employing a photoresist (e.g., photoresist layer 903) which can be patterned using standard photolithographic techniques to form the required pattern to create the pattern, trenches, openings, etc., wherein the photoresist can be exposed to electromagnetic radiation through a mask having an image pattern of a desired layout (e.g., desired trenches, openings, line patterning, etc.). Openings are then formed in the photoresist in order to form the desired layout, e.g., by etching away the exposed material (in the case of a positive photoresist) or etching away the unexposed material (in the case of a negative photoresist). Depending on the material of the photoresist, exposure can create a positive or a negative. With a positive photoresist, exposure causes a chemical change in the photoresist such that the portions of the photoresist layer exposed to light become soluble in a developer. With a negative photoresist, the chemical change induced by exposure renders the exposed portions of the photoresist layer insoluble to the developer. After exposure and develop, a layout according to the desired pattern can be laid out on the first layer. A subsequent processing step, such as an etching step or an ion implantation step, can be performed and controlled according to the layout. For instance, after exposure and develop, material in the first layer not covered by the photoresist layer can be etched, thus transferring the pattern to the first layer. The photoresist can be subsequently removed. Etching can be by any viable dry or wet etching technique. For example, a wet or dry etching technique can be employed for patterning, while in another aspect, etching can be by a specific anisotropically etch.

Any etching/material removal technique is applicable to the various embodiments, as described herein. Wet etching can be utilized to remove a particular layer where a given layer may be susceptible to etch by a particular etchant while a neighboring layer is not. In another example, anisotropic etching techniques can be utilized to control material removal in a specific direction (unlike standard wet etching) such as vertically down into a stack to form an opening, etc.

Leveling of layers after formation can be by any suitable technique, e.g., by chemical mechanical polish/planarization (CMP) or other suitable process, to achieve a given dimension, in preparation for the next stage in creation of the replacement gate/contact structure, etc.

It is to be appreciated that while the formation of a pore from a micropore is described, there may be certain procedures that are not fully disclosed during description of the various embodiments as presented herein. However, rather than provide description of each and every operation involved in the various operations facilitating formation, patterning, removal, etc., of each structure presented herein, for the sake of description only the general operations are described as can be appreciated by one of ordinary skill in the art. Hence, while no mention may be presented regarding a particular operation pertaining to aspects of a particular figure, it is to be appreciated that any necessary operation, while either not fully disclosed, or not mentioned, to facilitate formation/deconstruction of a particular layer/element/aspect presented in a particular figure is considered to have been conducted. For example, while no mention may be made regarding a layer described in a preceding figure being leveled (e.g., by chemical mechanical polish, or other suitable operation) it is considered, for the sake of readability of the various exemplary embodiments presented herein, that the leveling process occurred, as have any other necessary operations. It is appreciated that the various operations, e.g., leveling, chemical mechanical polish, patterning, photolithography, deposition, layer formation, etching, etc., are well known procedures and are not necessarily expanded upon throughout this description.

General Considerations

It is noted a computer environment can be utilized to execute or implement portion(s) of the various embodiments described herein, e.g., switching or voltage control. Those skilled in the art will recognize that the various aspects, such as switching or voltage control, can be implemented as software, hardware, or in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. Further, computer instructions/operations can be stored in memory in the form of non-transitory, or tangible, computing elements (e.g., computer readable storage medium), where such instructions/operations can be executed, e.g., by a processor, to facilitate operation of one or more exemplary, non-limiting embodiments, as presented herein.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

What has been described above includes examples of the various embodiments. It is, of course, not possible to describe every conceivable combination of components or methodologies for purposes of describing the disclosed subject matter, but one of ordinary skill in the art may recognize that many further combinations and permutations of the various embodiments are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising".

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

What is claimed is:

1. A system, comprising:
   a first waveguide that comprises an optically transparent material having first refractive index (RI);
   a second waveguide that comprises the optically transparent material;
   a switching element between the first waveguide and the second waveguide, wherein the switching element comprises the optically transparent material and comprises a plurality of pores filled with liquid crystal material, and wherein the liquid crystal material has a second refractive index (RI) that is higher than the first RI of the optically transparent material;

a first transparent electrode on a first side of the switching element; and a second transparent electrode on a second side of the switching element, wherein the first transparent electrode on the first side of the switching element and the second transparent electrode on the second side of the switching element are separated by the optically transparent material that comprises a first portion of the plurality of pores, wherein the first transparent electrode comprises a second portion of the plurality of pores and the second transparent electrode comprises a third portion of the plurality of pores, wherein, in response to application of a voltage to the first transparent electrode and the second transparent electrode that creates a homogeneous electric field associated with the plurality of pores, a refractive index of the plurality of pores filled with the liquid crystal material changes to the second RI and a light stream conveyed in a first conveying direction via the first waveguide reflects to a second conveying direction via the second waveguide, and wherein the first conveying direction and the second conveying direction are divergent.

2. The system of claim 1, wherein the optically transparent material is an optically isotropic polymer.

3. The system of claim 1, wherein the optically transparent material is polyethylene terephthalate, polyethylene terephthalate glycol-modified, or a cyclic olefin copolymer.

4. The system of claim 1, wherein the liquid crystal material is a nematic liquid crystal, a ferroelectric liquid crystal, or a polymeric liquid crystal.

5. The system of claim 1, wherein molecules of the liquid crystal material are in a passive state alignment when an electrical voltage is not being applied to the liquid crystal material and are in an active state alignment when the electrical voltage is being applied to the liquid crystal material.

6. The system of claim 5, wherein the second RI of the liquid crystal material when the molecules of the liquid crystal material are in the active state alignment is higher than the second RI of the liquid crystal material when the molecules of the liquid crystal material are in the passive state alignment.

7. The system of claim 5, wherein the first RI of the optically transparent material is equal or substantially equal to the second RI of the liquid crystal material when the molecules of the liquid crystal material are in the passive state alignment.

8. The system of claim 5, further comprising at least one single electrode, wherein the at least one single electrode is configured to apply the electrical voltage to the liquid crystal material.

9. The system of claim 1, wherein the switching element is formed as a strip, a flat prism, a diffraction grating, or a microresonator.

10. The system of claim 1, wherein a portion of the first waveguide corresponds to the second waveguide.

11. The system of claim 1, further comprising a third waveguide, wherein the third waveguide is aligned parallel to the first waveguide and the light stream is conveyed by the third waveguide when no electrical voltage is applied to the liquid crystal material.

12. The system of claim 1, further comprising at least one cladding layer adjacent to the first waveguide and the second waveguide, wherein the at least one cladding layer comprises micropores created by ion bombardment of the optically transparent material, and is configured to constrain the light stream to the first waveguide and the second waveguide.

13. An optical waveguide, comprising:
a transparent plate comprising:
perpendicular waveguides;
at least one core region having a first refractive index;
at least one cladding region having a second refractive index lower than the first refractive index as a result of formation of first pores of non-liquid crystal material, wherein the at least one core region and the at least one cladding region are formed from a same optically isotropic polymer; and
at least one switching element positioned where the perpendicular waveguides cross to form at least one zone where, during application of a voltage, causes a switch of a light propagation direction of a light stream passing through the optical waveguide, wherein the at least one switching element comprises second pores that are filled with liquid crystal material;
a first transparent electrode on a first side of the at least one switching element; and
a second transparent electrode on a second side of the at least one switching element, wherein a first surface associated with the first transparent electrode comprises a conductive material and a first portion of the second pores, wherein a second surface associated with the second transparent electrode comprises the conductive material and a second portion of the second pores, wherein an optically transparent material of the at least one switching element comprises a third portion of the second pores, and wherein, in response to the application of the voltage to the first transparent electrode and the second transparent electrode, a refractive index associated with the second pores is altered to another refractive index and the light propagation direction of the transparent plate is switched to another propagation direction.

14. The optical waveguide according to claim 13, wherein the at least one zone is formed as at least one strip aligned to an axis of the optical waveguide corresponding to a first light propagation direction of the light stream when no voltage is applied to the first transparent electrode and the second transparent electrode, wherein the at least one strip provides passage of the light stream through the at least one strip according to the first light propagation direction in absence of the voltage being applied and provides reflection of the light stream from at least one interface of the at least one strip in a second light propagation direction different than the first light propagation direction during the application of the voltage.

15. The optical waveguide according to claim 13, wherein the at least one zone is formed as at least one prism, wherein the at least one prism provides passage of the light stream through the at least one prism in the absence of the application of the voltage and decomposes the light stream to at least one constituent color component in response to the application of the voltage.

16. The optical waveguide according to claim 13, wherein the at least one zone is formed as at least one set of alternating strips aligned to an axis of the optical waveguide corresponding to the first light propagation direction of the light stream when no voltage is applied to the first transparent electrode and the second transparent electrode, wherein a set of alternating strips of the at least one set of alternating strips comprises at least one first strip comprising the second pores filled with the liquid crystal material and at least one second strip not comprising the second pores filled with the liquid crystal material, and wherein the set of alternating strips form a phase diffraction grating in response to the application of the voltage that decomposes the light stream in a waveguide plane to color components of the light stream resulting in a diffracted light stream.

17. The optical waveguide according to claim 16, wherein the phase diffraction grating is located perpendicularly to axes of distribution of the light stream, and the phase diffraction grating enables an exit of the diffracted light stream from the waveguide plane.

18. The optical waveguide according to claim 16, wherein the phase diffraction grating is located perpendicularly to axes of distribution of the light stream, and the phase diffraction grating enables an input of the light stream falling on the phase diffraction grating under some angle from a source of light stream being out of the waveguide plane.

19. The optical waveguide according to claim 13, wherein the at least one zone is formed as pieces of the perpendicular waveguides integrated with ring microresonators, bearing the light stream, configured to extract separate wavelengths from the light stream and to redirect the separate wavelengths to other pieces of the perpendicular waveguides.

20. An optical waveguide device, comprising:
a transparent plate comprising:
  perpendicular waveguides; and
  at least one core region having a first refractive index and at least one cladding region having a second refractive index lower than the first refractive index, wherein the at least one core region and the at least one cladding region are formed from a same optically isotropic polymer;
a first transparent electrode on a first side of a switching element; and
a second transparent electrode on a second side of the switching element, wherein the switching element comprises a first portion of a set of pores associated with liquid crystal material, wherein the first transparent electrode comprises a second portion of the set of pores associated with the liquid crystal material, wherein the second transparent electrode comprises a third portion of the set of pores associated with the liquid crystal material, and wherein application of a voltage to the at least one pair of transparent electrodes creates a homogeneous electric field for the set of pores, changes a refractive index of the liquid crystal material, and refracts a light stream conveyed in a first conveying direction via the perpendicular waveguides to a second conveying direction via the perpendicular waveguides based on a degree of the application of the voltage to the at least one pair of transparent electrodes.

* * * * *